United States Patent
Yatsuri et al.

(10) Patent No.: US 11,012,621 B2
(45) Date of Patent: May 18, 2021

(54) IMAGING DEVICE HAVING CAPABILITY OF INCREASING RESOLUTION OF A PREDETERMINED IMAGING AREA USING A FREE-FORM LENS

(71) Applicant: Panasonic Intellectual Property Management Co., Ltd., Osaka (JP)

(72) Inventors: Shigenori Yatsuri, Osaka (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/699,693

(22) Filed: Dec. 1, 2019

(65) Prior Publication Data

US 2020/0374457 A1    Nov. 26, 2020

(30) Foreign Application Priority Data

May 24, 2019 (JP) .............................. JP2019-097783

(51) Int. Cl.
*H04N 5/232* (2006.01)
*G02B 13/06* (2006.01)
*H04N 5/225* (2006.01)

(52) U.S. Cl.
CPC ......... *H04N 5/23238* (2013.01); *G02B 13/06* (2013.01); *H04N 5/2259* (2013.01); *H04N 5/2254* (2013.01)

(58) Field of Classification Search
CPC ............. H04N 5/23238; H04N 5/2259; H04N 5/2254; G02B 13/06; G02B 3/06; G02B 13/08
See application file for complete search history.

(56) References Cited

U.S. PATENT DOCUMENTS 7,595,938 B2 * 9/2009 Yamakawa ............ G02B 13/04
                                                              359/749
7,893,985 B1    2/2011 Ahiska
(Continued)

FOREIGN PATENT DOCUMENTS

CN    105259645 B    1/2019
JP    2008-76716 A    4/2008
(Continued)

OTHER PUBLICATIONS

Extended European Search Report for corresponding European Application No. 19214313.9, dated Jun. 24, 2020.

*Primary Examiner* — Luong T Nguyen
(74) *Attorney, Agent, or Firm* — Renner, Otto, Boisselle & Sklar, LLP

(57) ABSTRACT

An imaging device includes a free-form lens having a shape in which (i) in a long-side direction of an imaging element, a resolution that changes along an optical axis long-side resolution curve, and the resolution that changes along a distant point long-side resolution curve in a position away from an optical axis, (ii) in a short-side direction, the resolution that changes along an optical axis short-side resolution curve, and the resolution that changes along a distant point short-side resolution curve in the position away from the optical axis, (iii) the distant point long-side resolution curve follows a shape of the optical axis long-side resolution curve, and has a higher resolution than the optical axis long-side resolution curve, and (iv) the distant point short-side resolution curve follows a shape of the optical axis short-side resolution curve, and has a higher resolution than the optical axis short-side resolution curve.

6 Claims, 14 Drawing Sheets

(56) References Cited

U.S. PATENT DOCUMENTS

| | | | |
|---|---|---|---|
| 2007/0091196 A1 | 4/2007 | Miyanohara | |
| 2008/0074761 A1 | 3/2008 | Yamakawa | |
| 2018/0120545 A1* | 5/2018 | Aihara | G02B 3/02 |
| 2018/0131874 A1* | 5/2018 | Tamura | H04N 5/23287 |
| 2018/0160052 A1* | 6/2018 | Aihara | H04N 5/23232 |

FOREIGN PATENT DOCUMENTS

| | | |
|---|---|---|
| JP | 2016-027438 A | 2/2016 |
| JP | 2016148725 A | 8/2016 |
| WO | 2017174867 A1 | 10/2017 |
| WO | 2018/230034 A1 | 12/2018 |

* cited by examiner

FIG. 10
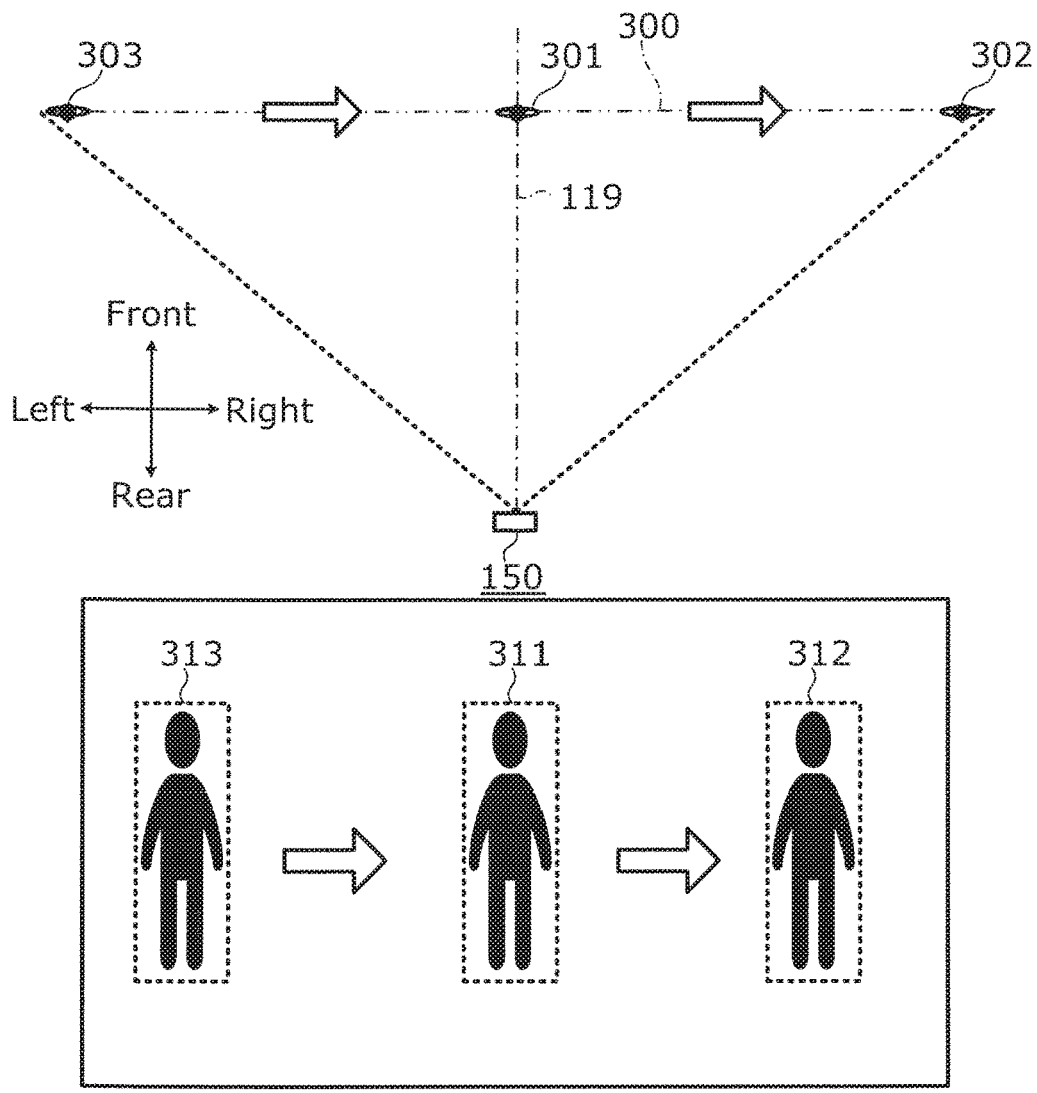
Lens system of present disclosure
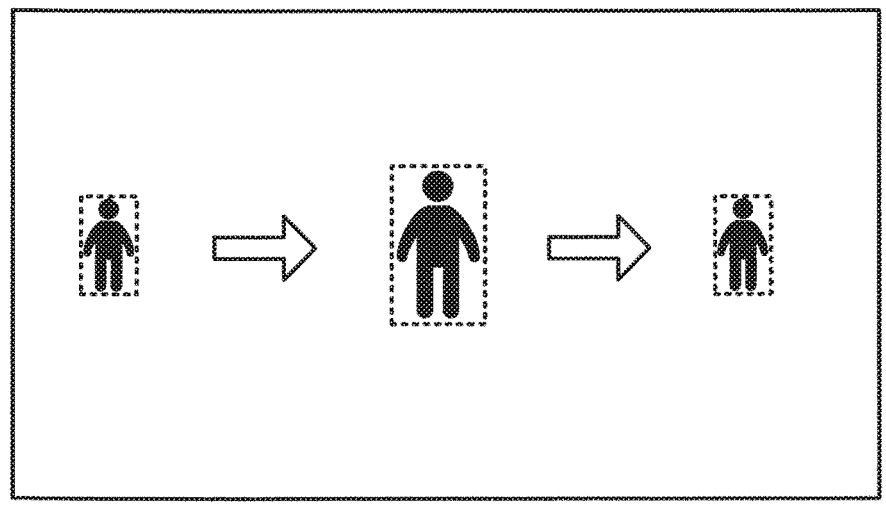
Conventional lens system FIG. 15
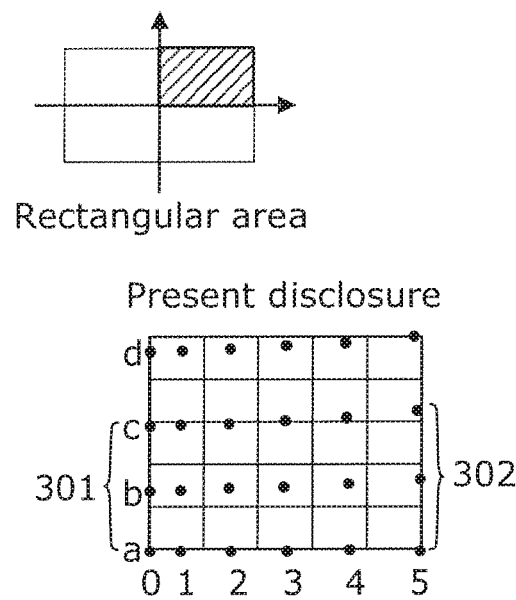
Rectangular area
Present disclosure
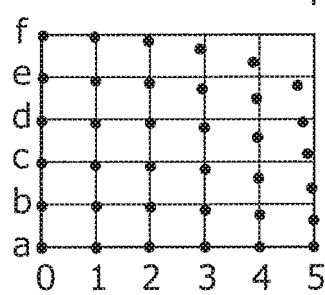
Conventional technique 1
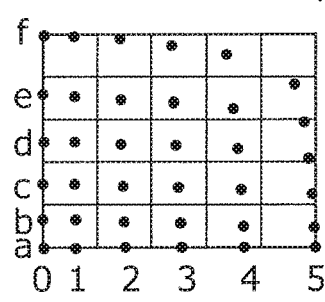
Conventional technique 2

IMAGING DEVICE HAVING CAPABILITY OF INCREASING RESOLUTION OF A PREDETERMINED IMAGING AREA USING A FREE-FORM LENS

CROSS REFERENCE TO RELATED APPLICATION

The present application is based on and claims priority of Japanese Patent Application No. 2019-097783 filed on May 24, 2019. The entire disclosure of the above-identified application, including the specification, drawings and claims is incorporated herein by reference in its entirety.

FIELD

The present disclosure relates to an imaging device that generates an imaging object inside a predetermined area as image data.

BACKGROUND

In recent years, there has been demand for widening the angle of view in a horizontal plane of in-vehicle optical cameras for obtaining a large amount of data frontward of a vehicle.

Patent Literature (PTL) 1, for example, recites an imaging device including a compact and lightweight lens that is capable of realizing an ultra wide angle while maintaining favorable optical properties by using a rotationally symmetric aspheric lens.

CITATION LIST

Patent Literature

PTL 1: Japanese Unexamined Patent Application Publication No. 2008-76716

SUMMARY

Technical Problem

When using a generic imaging element with a commonly-used aspect ratio, however, not only the angle of view in a horizontal direction, but also the angle of view in a vertical direction is enlarged, causing in-vehicle cameras to image at such a wide range that even unnecessary objects, e.g. the sky or the hood of a vehicle, are also captured when attempting to widen the angle of view with an imaging device that includes a conventional rotationally symmetric lens. For example, as the angle of view is widened further, e.g. to 100°, the resolution of a region in a traveling direction necessary for the in-vehicle camera to capture, e.g. signals or signs, is reduced.

Hereinafter, an imaging device is disclosed that is capable of increasing an imaging area by using a free-form lens even in the case of an imaging element with a predetermined aspect ratio.

Solution to Problem

An imaging device according to the present disclosure includes an imaging element in which a plurality of imaging pixels are arranged in a matrix in a rectangular area, and a lens system including a free-form lens for forming an image in the rectangular area of the imaging element. The free-form lens has (i) in a long-side direction of the rectangular area, a resolution that changes along an optical axis long-side resolution curve in which the resolution increases from the optical axis toward a first end that is at least one end, and the resolution that changes along a distant point long-side resolution curve in which the resolution increases from a position away from the optical axis in the short-side direction toward the first end, and (ii) in the short-side direction of the rectangular area, the resolution that changes along an optical axis short-side resolution curve in which the resolution increases from the optical axis of the lens system toward a second end that is at least one end, the resolution that changes along a distant point short-side resolution curve in which the resolution increases from the position away from the optical axis in the long-side direction toward the second end. The free-form lens having a shape that makes it possible to form an image in the rectangular region so that (i) the distant point long-side resolution curve follows a shape of the optical axis long-side resolution curve, and has the resolution that is higher than the resolution of the optical axis long-side resolution curve, and (ii) the distant point short-side resolution curve follows a shape of the optical axis short-side resolution curve, and has the resolution that is higher than the resolution of the optical axis short-side resolution curve.

Advantageous Effects

As described above, by using a free-form lens, the imaging device of the present disclosure makes it possible to increase the resolution of a predetermined imaging area by decreasing the angle of view in a short-side direction of an imaging element that is perpendicular to a long-side direction while maintaining a wide angle in the long-side direction, even when using an imaging element with a predetermined aspect ratio.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a diagram comparing a state of an image when a person walking from left to right in a plane perpendicular to the optical axis is captured with the lens system according to the present embodiment with when the image is captured with a conventional lens system.

FIG. 15 is a diagram comparing a position in which the area shown in FIG. 14 is formed in the imaging area with conventional techniques.

DESCRIPTION OF EMBODIMENT

An embodiment of an imaging device according the present disclosure will be described next with reference to the drawings. Note that the following embodiment is merely an example of the imaging device according the present disclosure. Therefore, the scope of the present disclosure is defined by the recitations in the claims, with reference to the following embodiment, and is not limited to only the following embodiment. As such, among the structural elements in the following embodiments, structural elements not recited in any one of the independent claims defining the most generic part of the present disclosure are not necessarily required to overcome the object of the present disclosure, but are described as structural elements of a more preferable form.

The drawings are schematic diagrams in which highlighting, omission, or adjustment of proportions have been carried out as necessary in order to describe the present disclosure, and may differ from the actual shapes, positional relationships, and proportions.

Embodiment

Figure 1:
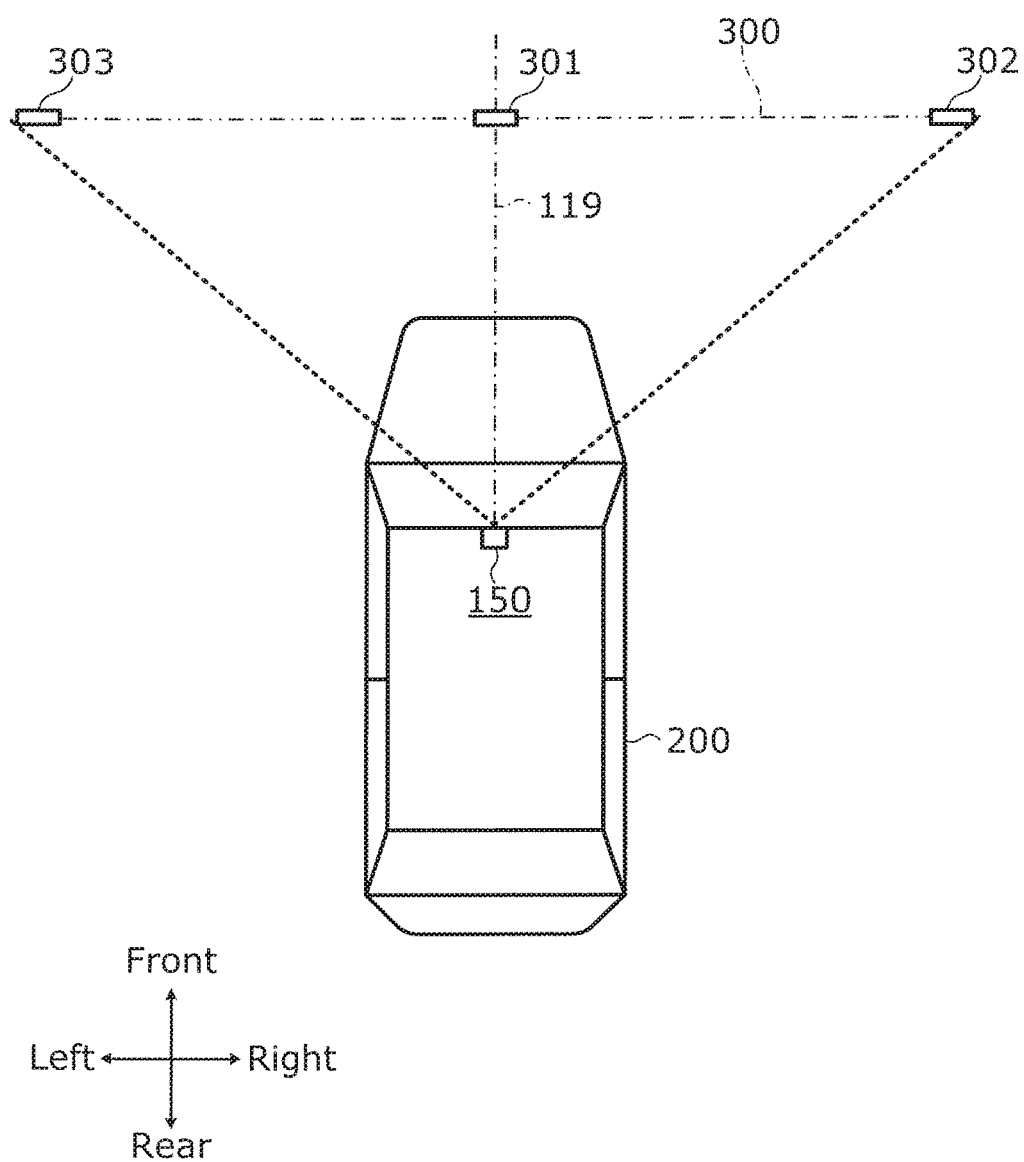
FIG. 1 is a plan view of an imaging system attached to a moving body and an angle of view in a horizontal plane.
Figure 2:
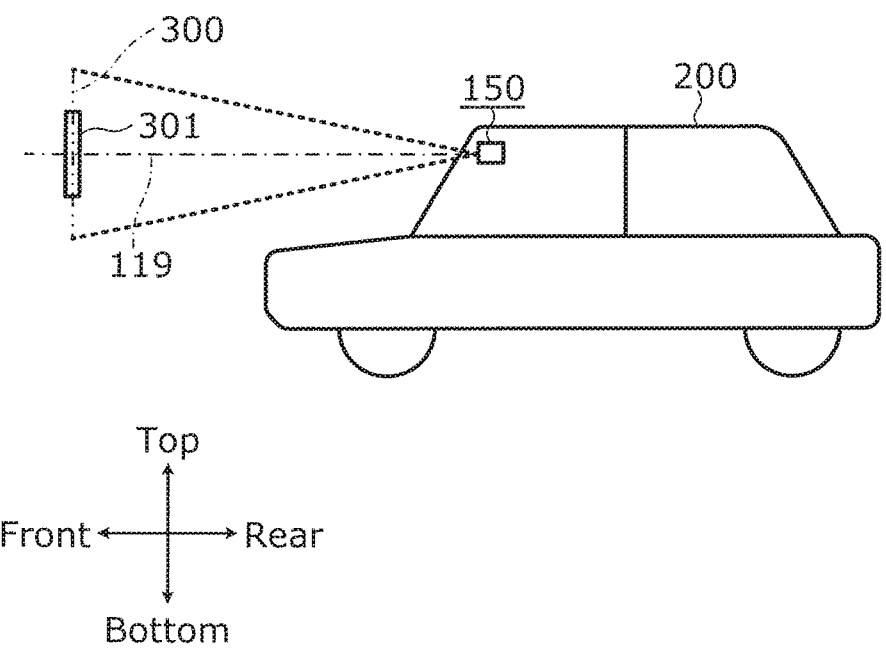
FIG. 2 is a short-side view of the imaging system attached to the moving body and an angle of view in a vertical plane.
Figure 3:
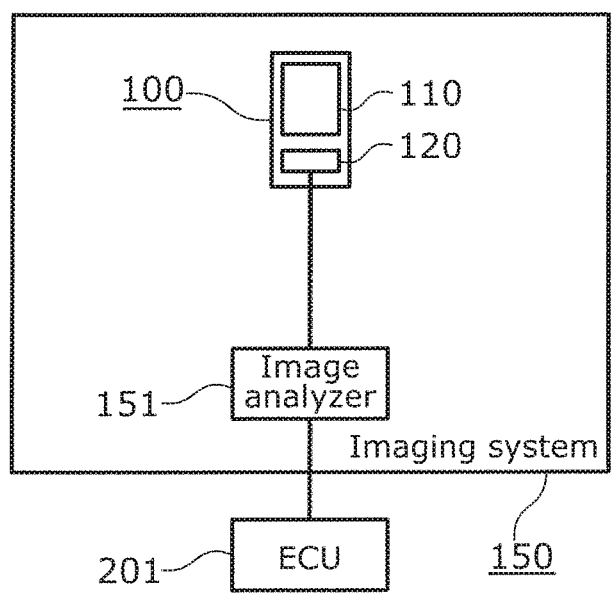
FIG. 3 is a block diagram showing a mechanism unit and a function unit of the imaging system along with an electronic control unit (ECU) of the moving body.

FIG. 1 is a plan view of an imaging system attached to a moving body and an angle of view in a horizontal plane. FIG. 2 is a short-side view of the imaging system attached to the moving body and an angle of view in a vertical plane. FIG. 3 is a block diagram showing a mechanism unit and a function unit of the imaging system along with an electronic control unit (ECU) of the moving body. As illustrated in these drawings, imaging device 100 includes imaging system 150 having image analyzer 151. Imaging system 150 including imaging device 100 is attached to moving body 200, e.g. a vehicle, and is capable of outputting a result of an image analysis by image analyzer 151 to ECU 201 that controls the traveling and the like of moving body 200.

Moving body 200 is a device that moves through a space with imaging system 150 attached thereto. In the present embodiment, moving body 200 is a vehicle, e.g. a car, that is capable of carrying people and moving down a road.

Figure 4:
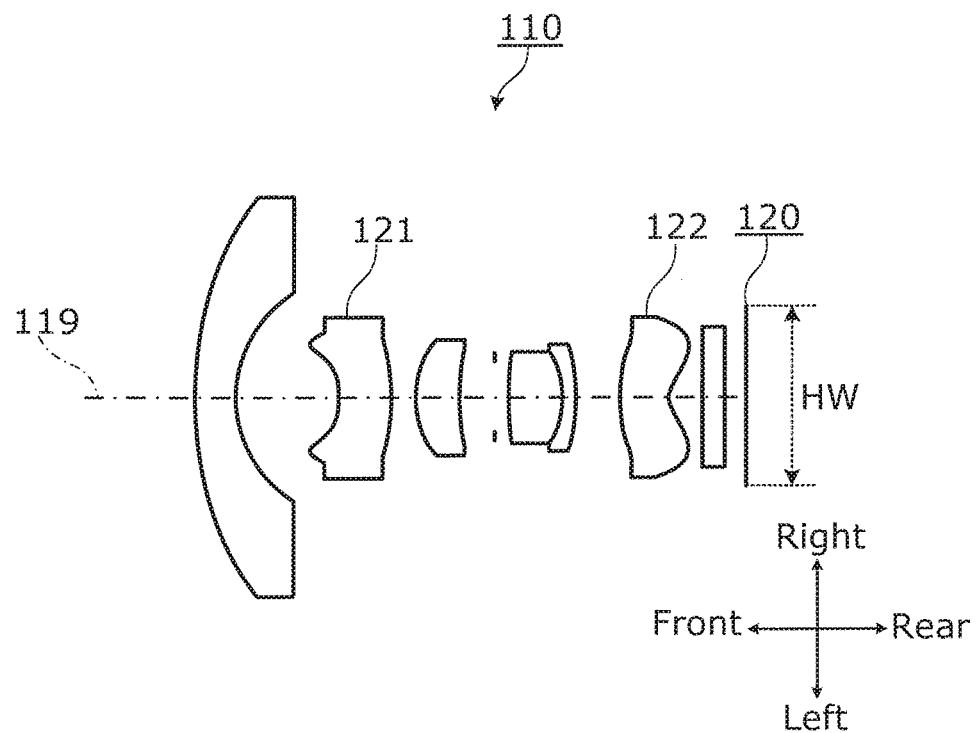
FIG. 4 is a configuration diagram showing a cross section of a lens system virtually cut along the horizontal plane including an optical axis.
Figure 5:
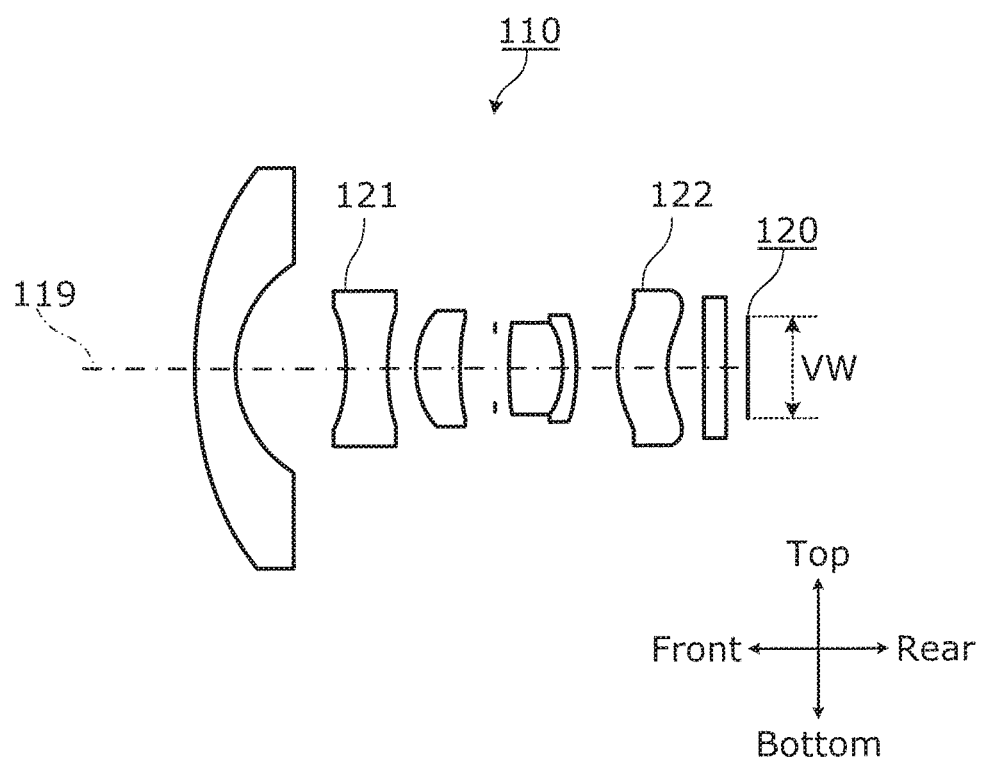
FIG. 5 is a configuration diagram showing a cross section of the lens system virtually cut along the vertical plane including the optical axis.

FIG. 4 is a configuration diagram showing a cross section of a lens system and an imaging element virtually cut along the horizontal plane including an optical axis. FIG. 5 is a configuration diagram showing a cross section of the lens system and the imaging element virtually cut along the vertical plane including the optical axis. As illustrated in these drawings, imaging device 100 is capable of, for example, outputting imaging objects such as first imaging object 301, second imaging object 302, and third imaging object 303 included in imaging area 300 (see FIG. 1 and FIG. 2) that virtually exists frontward of moving body 200 to image analyzer 151 of imaging system 150 as image data. Imaging device 100 includes lens system 110 and imaging element 120.

Imaging element 120 includes imaging pixels arranged in a matrix in a rectangular area that is an imaging surface. Imaging element 120 is capable of converting an image linked to the imaging surface through lens system 110 to the image data. To give a specific example, imaging element 120 is a so-called imaging sensor such as a complementary metal-oxide-semiconductor (CMOS) or a charge-coupled device (CCD). An aspect ratio of the rectangular area of imaging element 120 is not particularly limited, but the aspect ratio of a generic imaging element 120 can be exemplified as 16:9, 4:3, etc. In the present embodiment, as illustrated in FIG. 4 and FIG. 5, an aspect ratio (vw:vh) of 16:9 is used for the rectangular area of imaging element 120, and imaging system 150 is attached to moving body 200 so that a long-side direction of imaging element 120 is parallel with the horizontal plane during normal travel of moving body 200.

Lens system 110 is a device that captures the image of an imaging object included imaging area 300 on the imaging surface that is the rectangular area of imaging element 120. Lens system 110 is a combination of lenses, diaphragms, filters, etc. At least one of the lenses included in lens system 110 is a free-form lens. In the present embodiment, lens system 110 includes first free-form lens 121 and second free-form lens 122 as the free-form lens.

Figure 6:
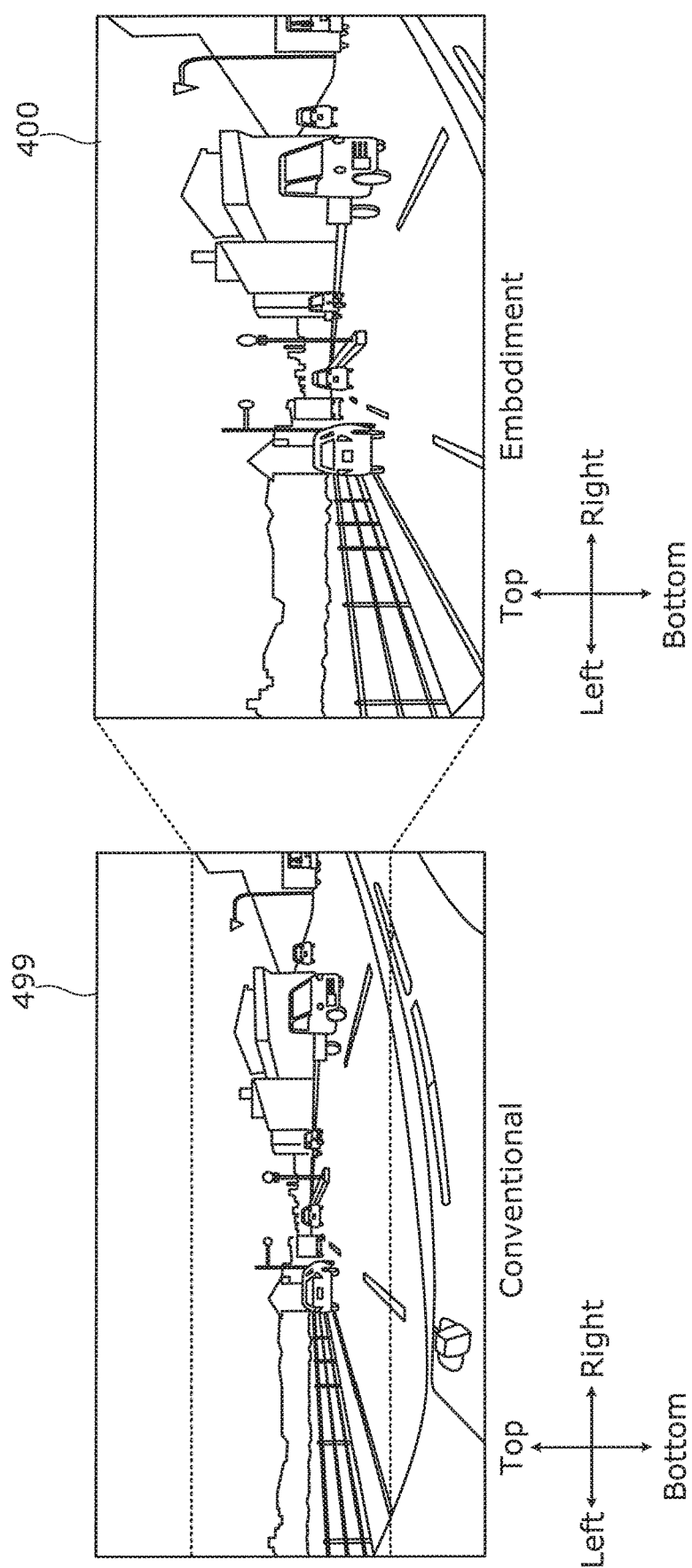
FIG. 6 is a diagram comparing a state of an image formed by the lens system according to the present embodiment with an image formed by a conventional lens system.

When using a wide-angle lens consisting of a conventional rotationally symmetric lens with an angle of view of approximately 100°, the image formed at the aspect ratio of the rectangular area of imaging element 120 is cropped and becomes conventional image 499 in FIG. 6. In this case, a portion above the top side dashed line (portion corresponding to sky and the like) and a portion below the bottom side dashed line (portion corresponding to dashboard and the like) shown in conventional image 499 hardly includes information necessary for the traveling of moving body 200.

In the present embodiment, lens system 110 forms image 400 that limits the angle of view in the short-side direction (top-bottom direction in the drawings) more than conventionally while maintaining the angle of view in the long-side direction (left-right direction in the drawings) by using the free-form lens, e.g. first free-form lens 121 and second free-form lens 122. In other words, the area between the two dashed lines in the image shown in the left drawing of FIG. 6 is formed as image 400 in the imaging area in a stretched state in the short-side direction. To give a specific example, a ratio of an angle of view in the long-side direction of lens system 110 to an angle of view in the short-side direction of lens system 110 is greater than or equal to a ratio of a length of the rectangular area of the imaging element in the long-side direction to a length of the rectangular area of the imaging element in the short-side direction.

Figure 7:
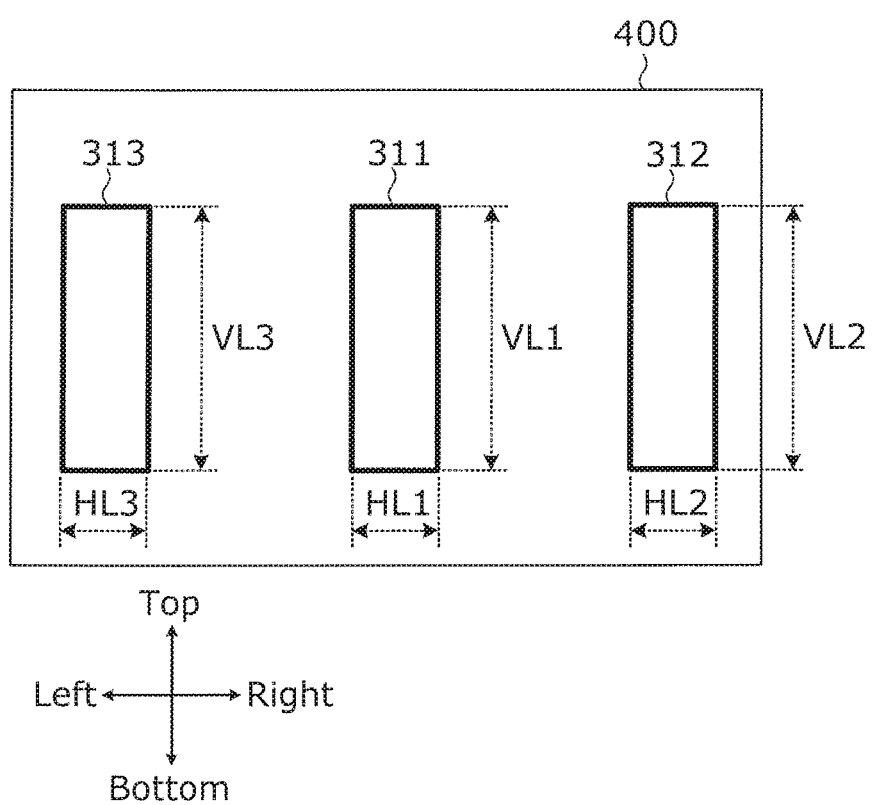
FIG. 7 is a diagram showing a state of an image formed by the lens system of three imaging objects in different long-side positions having the same shape.

In the present embodiment, as illustrated in FIG. 1 and FIG. 2, lens system 110 includes the free-form lens that has a shape that is adjusted so that optical axis short-side length VL1 and first distant point short-side length VL2 are equal, (i) optical axis short-side length VL1 being a length in the short-side direction of first image 311 (see FIG. 7) of first imaging object 301 that is formed in the rectangular area and exists on optical axis 119 of the lens system, and (ii) first distant point short-side length VL2 being a length in the short-side direction of second image 312 of second imaging object 302 that is formed in the rectangular area, exists in a position away from optical axis 119 in the long-side direction that intersects optical axis 119 and first imaging object 301, and has the same length as first imaging object 301 in the short-side direction. The free-form lens of the present embodiment has a shape that is adjusted so that second distant point short-side length VL3 of third image 313 of third imaging object 303 (length in the short-side direction is the same as first imaging object 301), which is located on a side opposite to second imaging object 302 with respect to first imaging object 301, is also equal to optical axis short-side length VL1. In other words, in the present embodiment, imaging objects in imaging area 300 with the same length that are aligned in the long-side direction perpendicular to optical axis 119 are formed in the rectangular area of imaging element 120 by lens system 110 as images with the same length.

Lens system 110 includes the free-form lens that has a shape that is adjusted so that optical axis long-side length HL1 and first distant point long-side length HL2 are equal, (i) optical axis long-side length HL1 being a length in the long-side direction of first image 311 of first imaging object 301 that is formed in the rectangular area and exists on optical axis 119, and (ii) first distant point long-side length HL2 being a length in the long-side direction of second image 312 of second imaging object 302 that is formed in the rectangular area, exists in the position away from optical axis 119 in the long-side direction that intersects optical axis 119 and first imaging object 301, and has the same length as first imaging object 301 in the long-side direction. The free-form lens of the present embodiment has a shape that is adjusted so that second distant point long-side length HL3 of third image 313 of third imaging object 303 (length in the long-side direction is the same as first imaging object 301) is also equal to optical axis long-side length HL1. In other words, in the present embodiment, imaging objects in imaging area 300 with the same width that are aligned in the long-side direction perpendicular to optical axis 119 are formed in the rectangular area of imaging element 120 by lens system 110 as images with the same width.

Figure 8:
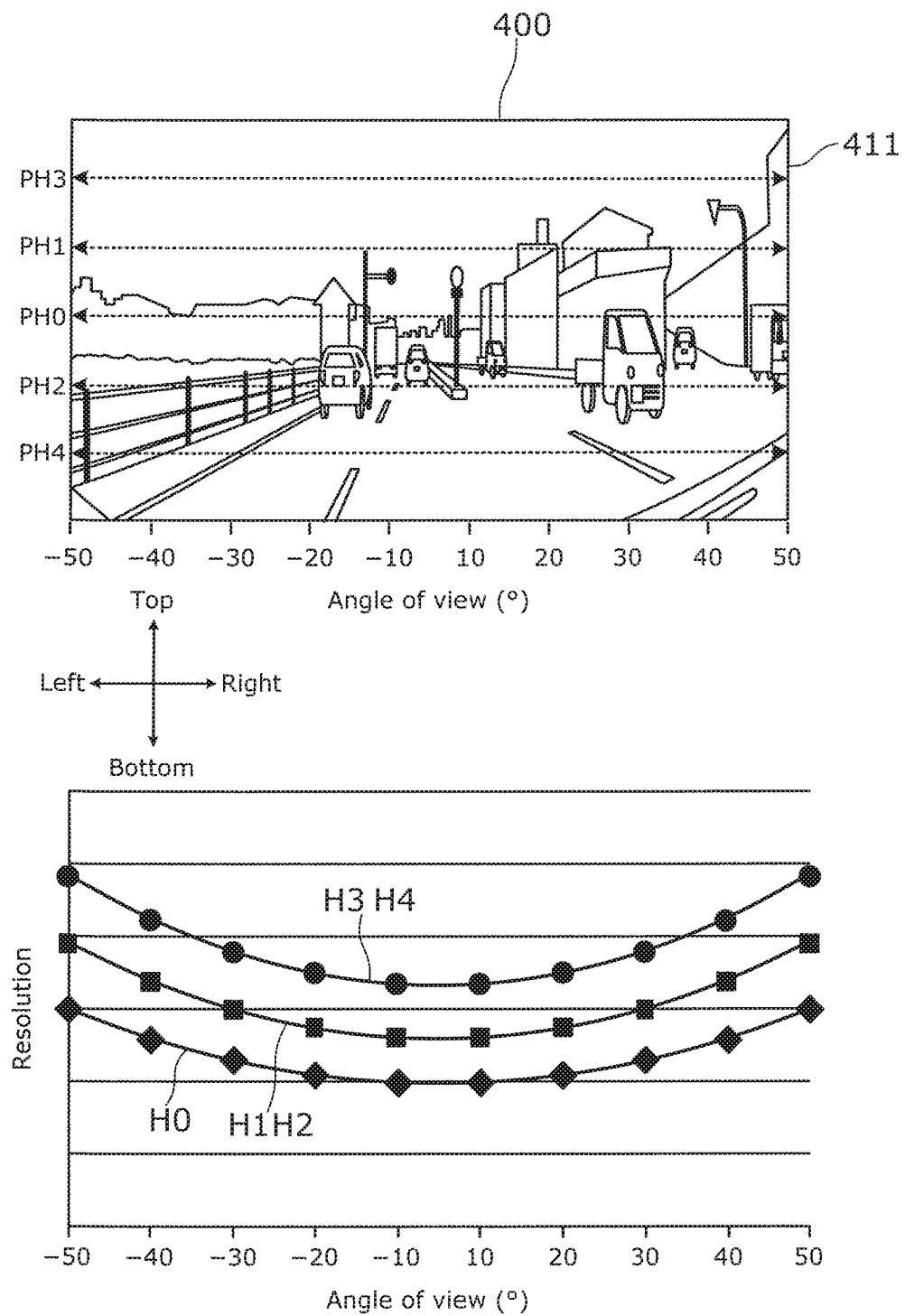
FIG. 8 is a diagram showing each long-side resolution curve corresponding to an imaging area.

FIG. 8 is a diagram showing each long-side resolution curve corresponding to the imaging area. Lens system 110 has, in the long-side direction of the rectangular area of imaging element 120, a resolution that changes along optical axis long-side resolution curve H0 in which the resolution increases from vertical optical axis position PV0 (see FIG. 9) of lens system 110 toward first end 411 that is at least one end, as illustrated in the bottom graph of FIG. 8. Lens system 110 also has the resolution that changes along first distant point long-side resolution curve H1 in which the resolution increases from vertical first position PH1 away from horizontal optical axis position PH0 in the short-side direction toward first end 411.

In the present embodiment, the resolution changes along third distant point long-side resolution curve H3 and fourth distant point long-side resolution curve H4 in (i) vertical second position PH2 at an opposite side of horizontal optical axis position PH0 at the same distance as vertical first position PH1 in the short-side direction, (ii) vertical third position PH3 that is farther away than vertical first position PH1 with respect to horizontal optical axis position PH0 in the short-side direction, and (iii) vertical fourth position PH4 that is farther away than vertical second position PH2 with respect to horizontal optical axis position PH0. Note that in the present embodiment, first distant point long-side resolution curve H1 and second distant point long-side resolution curve H2 are identical, and third distant point long-side resolution curve H3 and fourth distant point long-side resolution curve H4 are identical. Each distant point long-side resolution curve has the resolution that increases at the same rate along left and right positions with optical axis 119 as the center.

Figure 9:
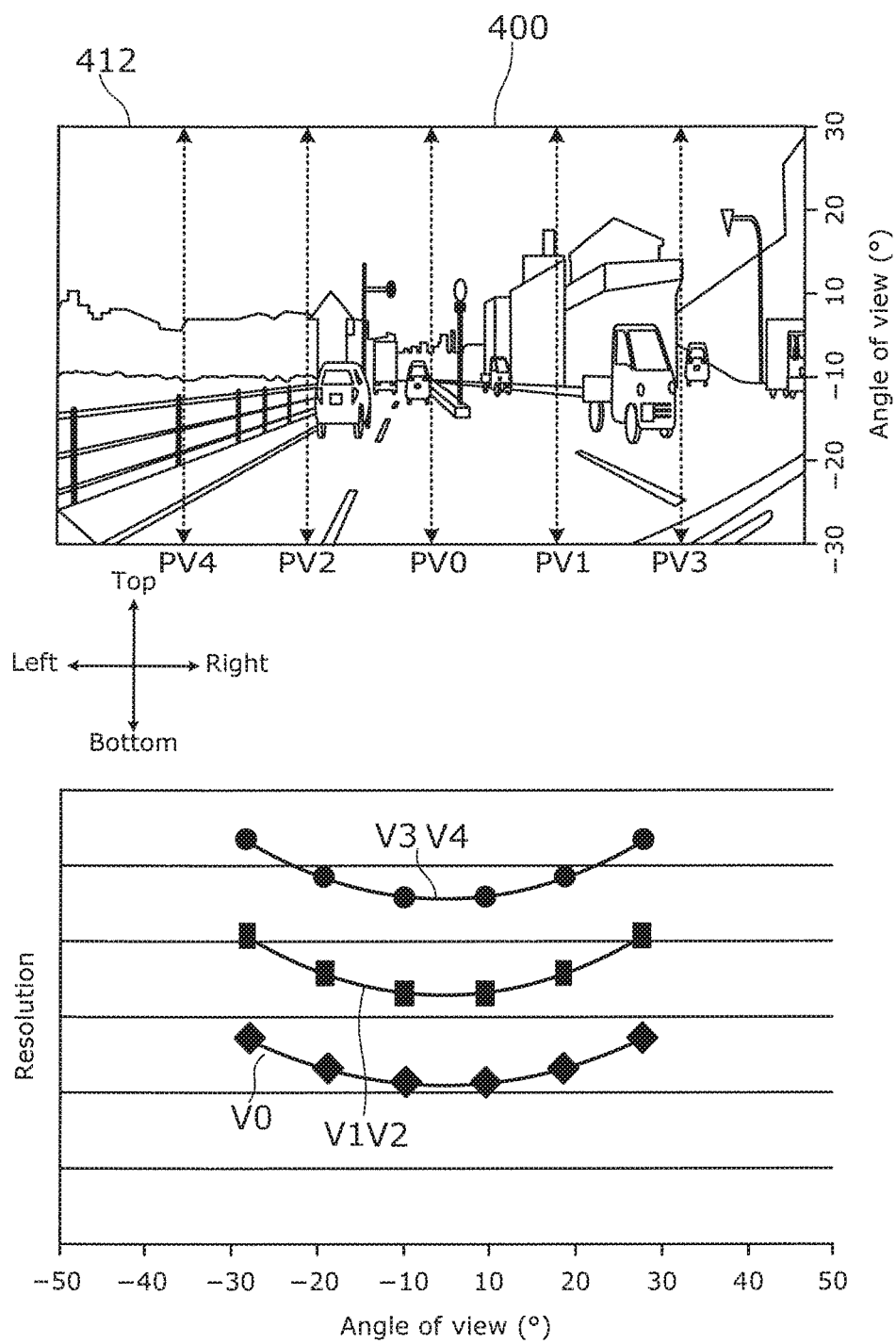
FIG. 9 is a diagram showing each short-side resolution curve corresponding to the imaging area.

FIG. 9 is a diagram showing each short-side resolution curve corresponding to the imaging area. Lens system 110 has, in the short-side direction of the rectangular area of imaging element 120, the resolution that changes along optical axis short-side resolution curve V0 in which the resolution increases from horizontal optical axis position PH0 (see FIG. 8) of lens system 110 toward second end 412 that is at least one end, as illustrated in the bottom graph of FIG. 9. Lens system 110 also has the resolution that changes along first distant point short-side resolution curve V1 in which the resolution increases from horizontal first position PV1 away from vertical optical axis position PV0 in the long-side direction toward second end 412.

In the present embodiment, the resolution changes along third distant point short-side resolution curve V3 and fourth distant point short-side resolution curve V4 in (i) horizontal second position PV2 at an opposite side of vertical optical axis position PV0 at the same distance as horizontal first position PV1 in the long-side direction, (ii) horizontal third position PV3 that is farther away than horizontal first position PV1 with respect to vertical optical axis position PV0 in the long-side direction, and (iii) horizontal fourth position PV4 that is farther away than horizontal second position PV2 with respect to vertical optical axis position PV0. Note that in the present embodiment, first distant point short-side resolution curve V1 and second distant point short-side resolution curve V2 are identical, and third distant point short-side resolution curve V3 and fourth distant point short-side resolution curve V4 are identical. Each distant point short-side resolution curve has the resolution that increases at the same rate along top and bottom positions with optical axis 119 as the center.

Each distant point long-side resolution curve follows a shape of optical axis long-side resolution curve H0, and has the resolution that is higher than the resolution of optical axis long-side resolution curve H0. Each distant point short-side resolution curve follows a shape of optical axis short-side resolution curve V0, and has the resolution that is higher than the resolution of optical axis short-side resolution curve V0. Each distant point long-side resolution curve has the resolution that increases from optical axis long-side resolution curve H0, and each distant point short-side resolution curve has the resolution that increases from optical axis short-side resolution curve V0.

The free-form lenses, which are capable of implementing (i) an angle of view in the vertical direction that is much smaller (e.g. half or less) than the angle of view in the horizontal direction as described above and (ii) the resolution with respect to imaging element 120 including the imaging pixels disposed uniformly in the rectangular area, have the following shape. In other words, as illustrated by first free-form lens 121 and second free-form lens 122 in FIG. 4 and FIG. 5, a cross-sectional shape in a plane (horizontal plane) including optical axis 119 and the long-side direction (left-right direction in the drawings), and a cross-sectional shape in a plane (vertical plane) including optical axis 119 and the short-side direction (top-bottom direction in the drawings) are different. The free-form lenses have a non-arched surface that refracts the light for the imaging and are not rotationally symmetric in a predetermined angle of rotation, except for at least a rotation of 180°, with optical axis 119 as its center. Note that the free-form lenses are different from cylindrical lenses and arched lenses. In the present description and the scope of the claims, rotationally symmetric indicates rotationally symmetric in an entire circumference with the optical axis as its center.

A material of the free-form lenses is not limited particularly limited, but can be exemplified as glass, a resin, or the like. A manufacturing method of the free-form lenses is not particularly limited either, but can be exemplified as, for example, a method for forming the free-form lenses using a mold, e.g. a metal mold.

Optical axis 119, as a rule, passes through the middle (center) of the imaging surface of imaging element 120, and is a virtual line perpendicular to the imaging surface. Note that when lens system 110 includes a mirror, prism, or the like that reflects light, optical axis 119 may curve due to the reflection.

The resolution is the number of imaging pixels that image an image included in a single angle of view. In the present embodiment, the resolution is the highest in the four corners of image 400 and the lowest in a proximity of optical axis 119.

In imaging device 100 including the above lens system 110, the angle of view in the short-side direction is smaller than the angle of view in the long-side direction across the entire long-side direction even when securing a wide angle of view in the long-side direction of imaging element 120. To be specific, it is possible for a ratio of an angle of view in the short-side direction (e.g. 56°) to an angle of view in the long-side direction (e.g. 100°) to be lower than a ratio of a length of the rectangular area of imaging element 120 in the short-side direction to a length of the rectangular area of imaging element 120 in the long-side direction. It is therefore possible to allocate all of the imaging pixels in the rectangular area to a small angle of view in the short-side direction, which means the imaging pixels included in a single angle of view are relatively increased. Accordingly, it is possible to secure an image with a higher resolution in at least the short-side direction than in the case of an imaging device including a lens system consisting of a rotationally symmetric lens that implements the same angle of view in the long-side direction across the entire circumference.

Image analyzer 151 is a processor that analyzes the image data obtained from imaging element 120, and, for example, determines whether any people are present in the obtained image. Since there is less image warping in the image data obtained from imaging device 100 than when using a conventional imaging device including a rotationally symmetric lens, image analyzer 151 is capable of shortening the time from imaging to determining without the need for imaging processing that eliminates warping from the obtained image data caused by the lens system. Since imaging device 100 outputs the image data in which the resolution increases from optical axis 119, image analyzer 151 improves analytical accuracy since it is possible to analyze imaging objects present at the end portions of the angle of view, e.g. traffic lights and signs, using high-resolution data. Since image analyzer 151 is capable of analyzing imaging objects, e.g. people or vehicles that suddenly enter the frame by approaching from the sides of moving body 200, at a high resolution, it is possible to accurately and quickly supply data necessary for an emergency avoidance by moving body 200 to ECU 201.

In the present embodiment, as illustrated in the middle part of FIG. 10, an aspect ratio of the image of a person obtained from the image data of imaging device 100 does not change when a person being an imaging object moves from the left to the right in the plane perpendicular to optical axis 119, as illustrated in the top part of FIG. 10.

Since the aspect ratio of an image of a person being an imaging object moving from the left to the right in the plane perpendicular to optical axis 119 changes in image data of an imaging device including a conventional lens system as illustrated in the bottom part of FIG. 10, image analyzer 151 corrects the aspect ratio of the image depending on the position of the image and determines that the image is a person. In the case of imaging device 100 including the free-form lenses of the present embodiment, however, since the aspect ratio is the same regardless of the position in a long-side direction (left-right direction), image analyzer 151 is capable of comparatively quickly determining whether the image is a person using the aspect ratio without needing to correct the aspect ratio depending on the position of the image.

In imaging device 100 of the present embodiment, since imaging objects arranged in the long-side direction with identical shapes (size also equal) in the plane perpendicular to optical axis 119 are outputted as image data including images with identical shapes, it is possible to derive a change in distance between the imaging objects and imaging device 100 using a difference in the size of images with an identical aspect ratio without needing to make corrections based on the characteristics of the lens system.

Note that the present invention is not limited to the above embodiment. For example, other embodiments that can be realized by optionally combining structural elements described in the present description or by removing certain structural elements may be embodiments of the present invention. Variations obtainable through various modifications to the above embodiment that can be conceived by a person of ordinary skill in the art without departing from the essence of the present invention, that is, the meaning of the recitations in the claims are included in the present invention.

In the above embodiment, the long-side direction of imaging element 120 has, for example, been described as being included in the horizontal plane, but may also be disposed along a vertical line. For example, the present embodiment can also be applied to a case in which moving body 200 is a drone and the like that images at a wide range from the traveling direction to down below.

Figure 11:
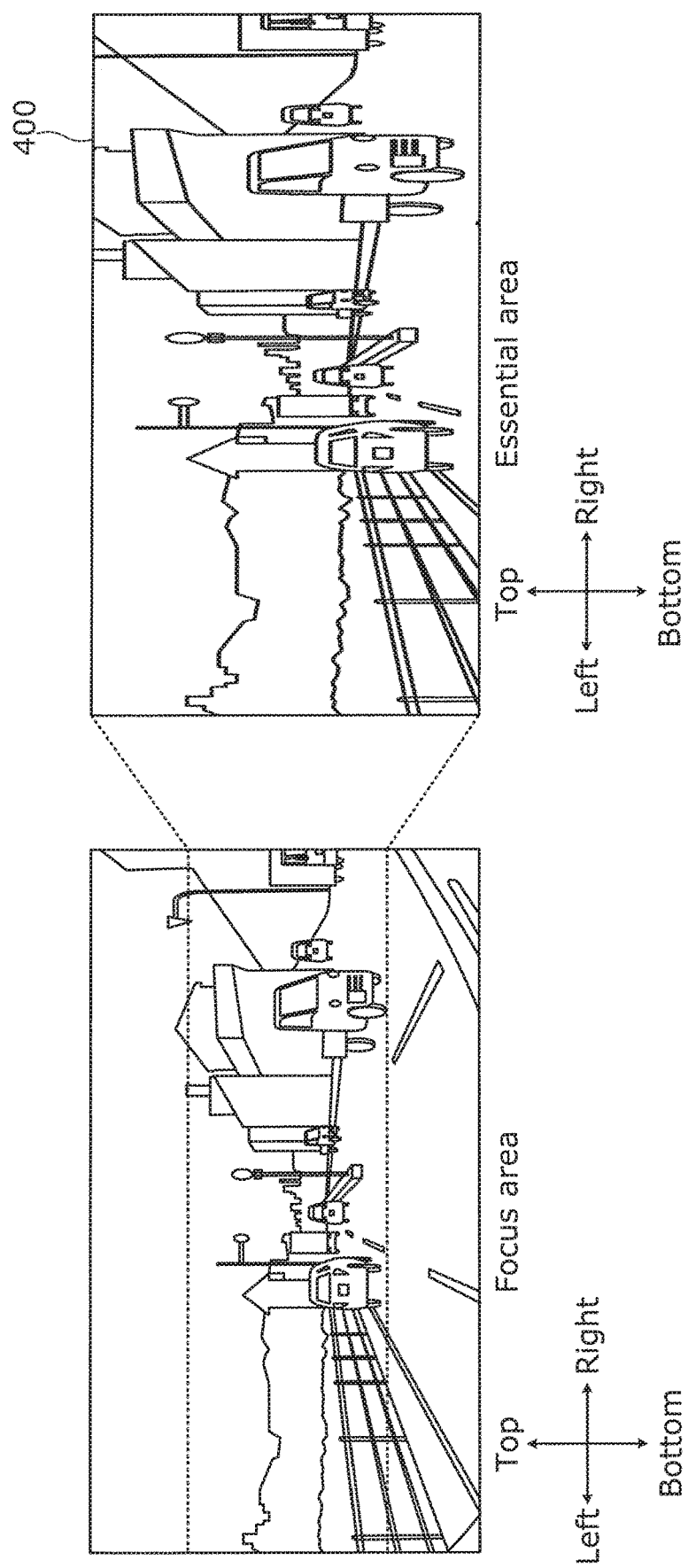
FIG. 11 is a diagram comparing a state of an image formed by another lens system with an image formed by the lens system of the embodiment.

As illustrated in FIG. 11, in the above embodiment, when the imaging area that lens system 110 captures is a focus area, a central area (e.g. −10° to 10°) of the angle of view in the short-side direction may be the essential area while maintaining the angle of view in the long-side direction (e.g. at 100°). By dividing the focus area into the essential area and areas other than the essential area, the essential area uses the means of Embodiment 1, but the areas other than the essential area do not need to satisfy the resolution characteristics of the above embodiment, e.g. may have the same resolution characteristics as a regular lens.

Figure 12:
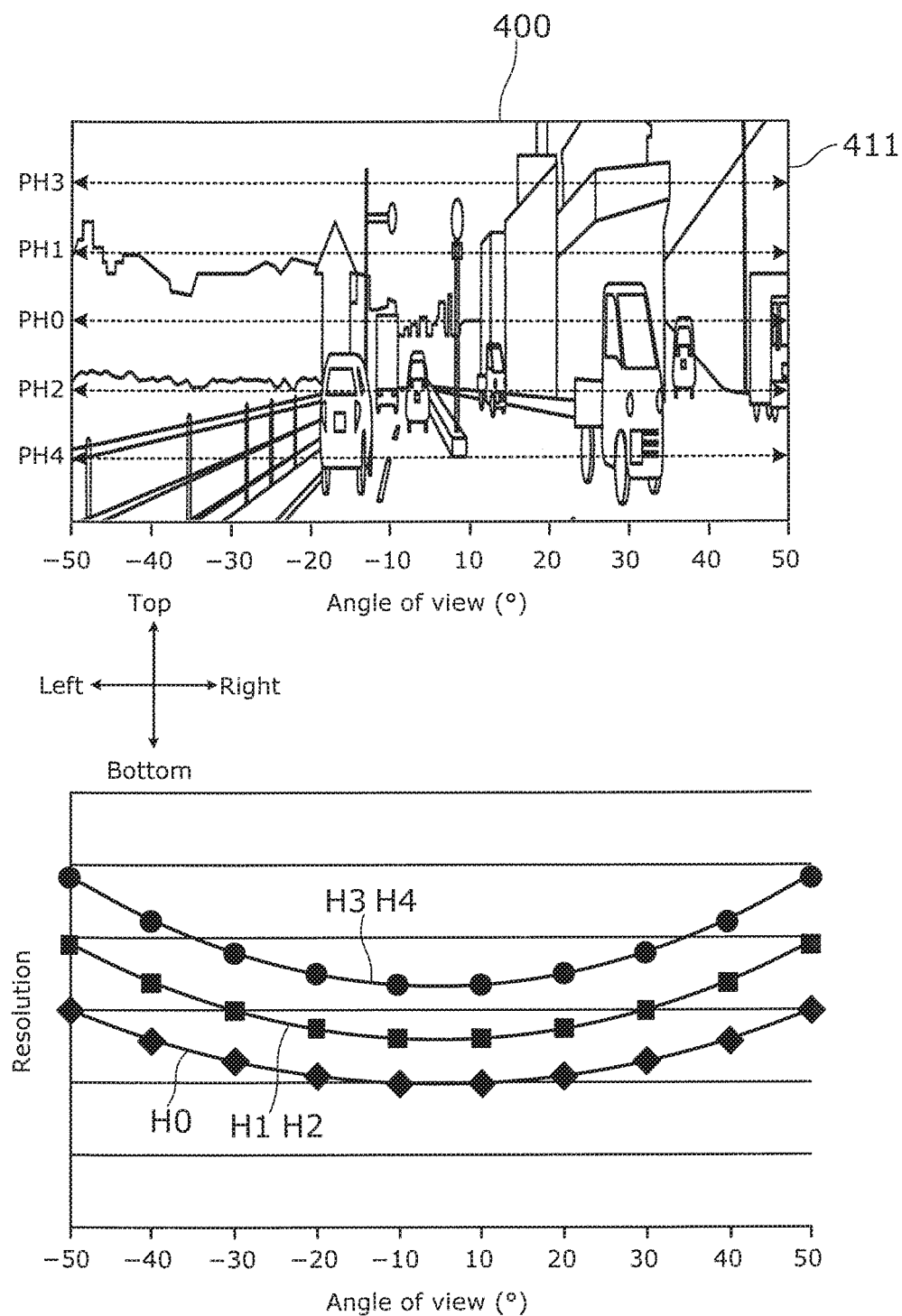
FIG. 12 is a diagram showing each long-side resolution curve corresponding to an essential area of the imaging area based on the other lens system.
Figure 13:
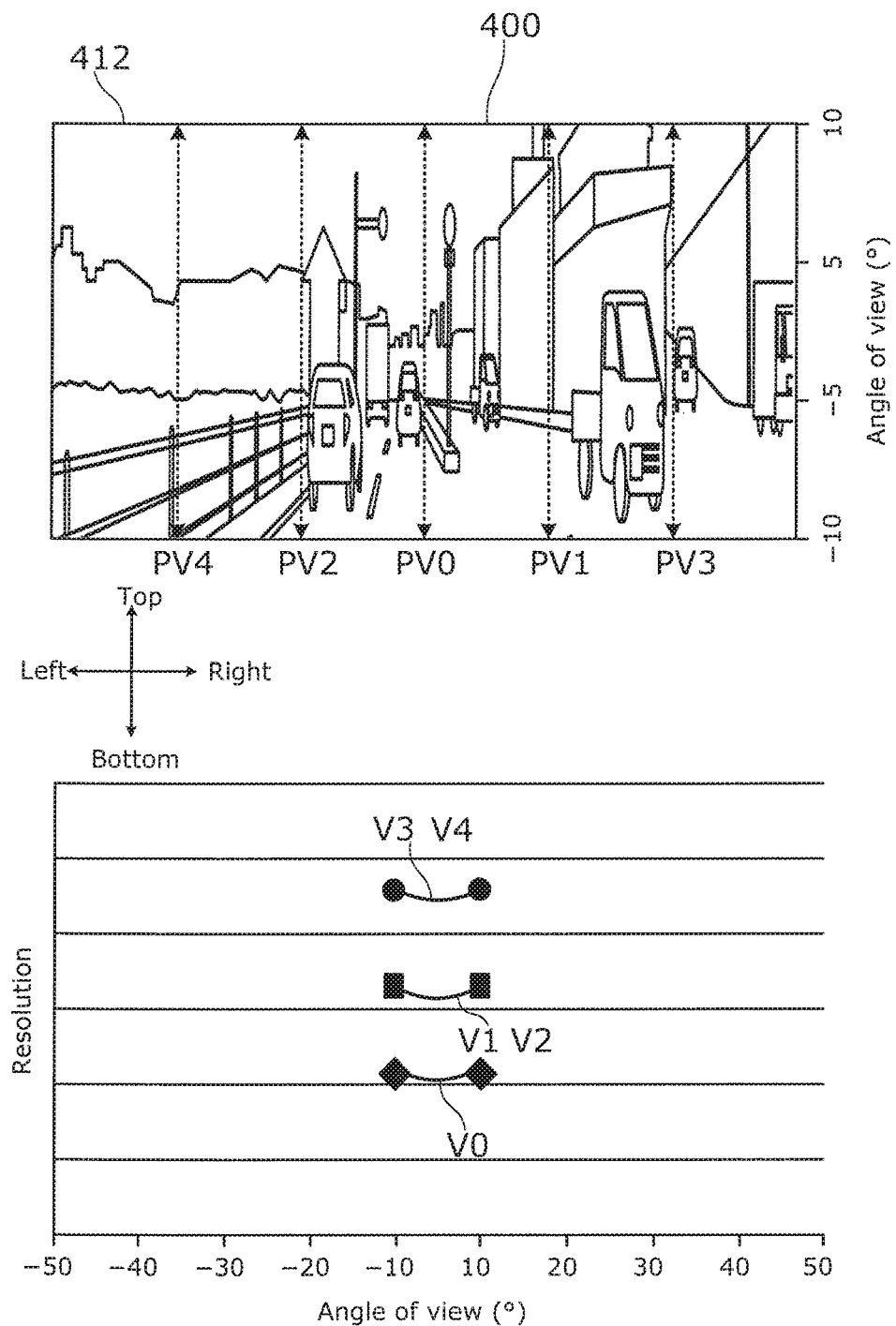
FIG. 13 is a diagram showing each short-side resolution curve corresponding to the essential area of the imaging area based on the other lens.

FIG. 12 and FIG. 13 are diagrams showing characteristics of the resolution curves in the essential area. When paying attention to only the essential area, the resolution curves in the long-side direction are shown in FIG. 12 and the resolution curves in the short-side direction are shown in FIG. 13. Thus, when wanting to reduce the burden on the optical design (e.g. scale down), it is possible only satisfy the characteristics of the resolution curve lines in FIG. 12 and FIG. 13, and achieve a more flexible optical design.

Figure 14:
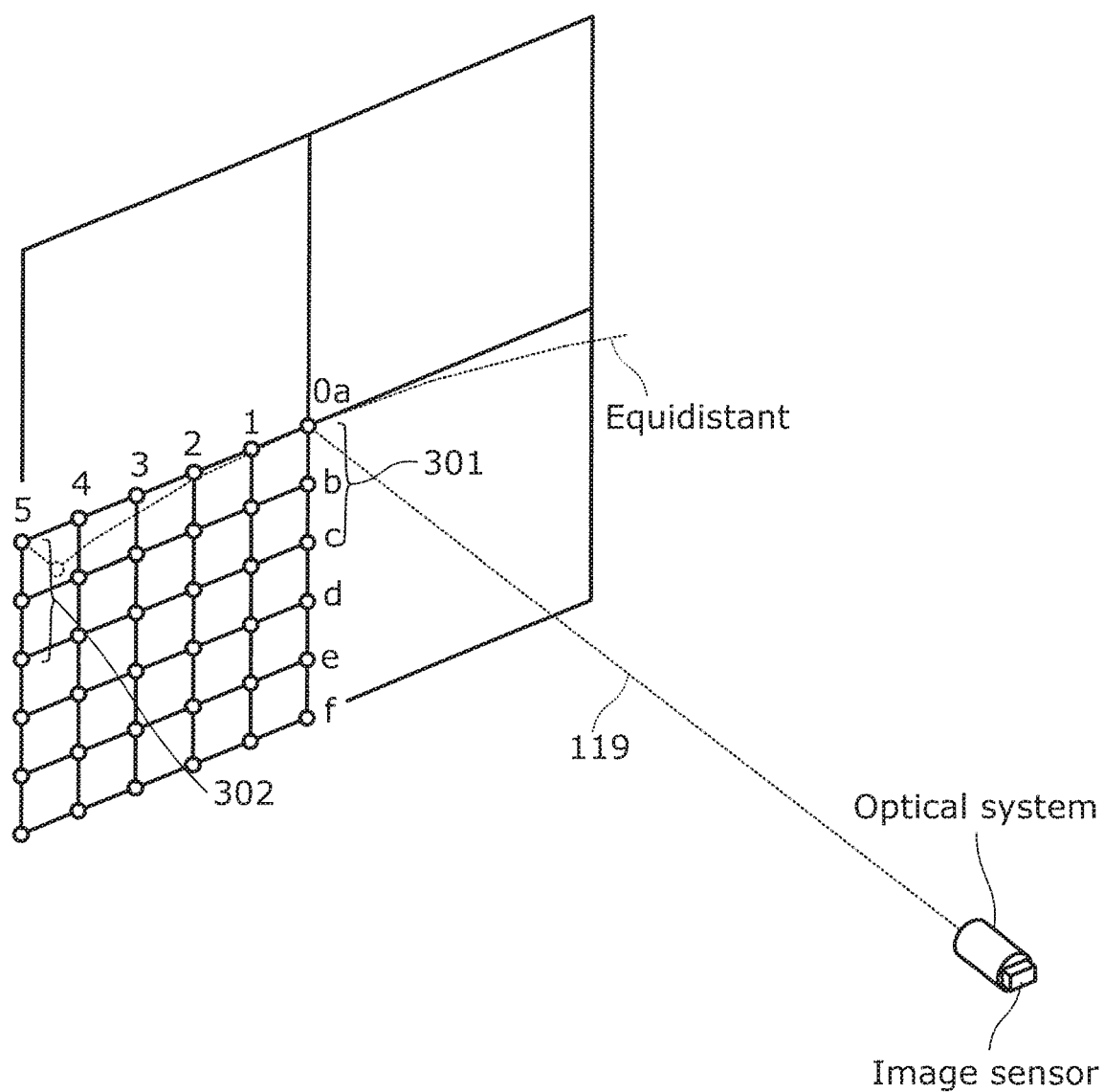
FIG. 14 is a perspective view of imaging conditions of the imaging system.

FIG. 14 is a diagram showing FIG. 1 and FIG. 2 three-dimensionally. FIG. 15 is a diagram showing a reconfiguration of FIG. 10 so as to correspond to FIG. 14 along with conventional techniques for comparison sake. As illustrated in these drawings, when the optical axis short-side length, which is the length in the short-side direction of the first image of first imaging object 301 that is formed in the rectangular area and exists on optical axis 119 of lens system 110, has the length of 0a to 0c in FIG. 14, the length formed in the rectangular area via lens system 110 corresponds to the length 0a to 0c in FIG. 15.

In the distant point short-side length—which is the length in the short-side direction of the second image of second imaging object 302 that is formed in the rectangular area, exists in the position away from optical axis 119 in the long-side direction that intersects optical axis 119 and first imaging object 301 (direction from 0a to 5a in the drawing), and has the same length as first imaging object 301 in the short-side direction—the length of 5a to 5c shown in FIG. 14 corresponds to the length of 5a to 5c shown in formed in the rectangular area via lens system 110.

In lens system 110 of the present disclosure, as illustrated in FIG. 15, the number of imaging pixels in the short-side direction devoted to imaging in the rectangular area from 0a to 0c (corresponding to the optical axis short-side length) and the number of imaging pixels in the short-side direction devoted to imaging in the rectangular area from 5a to 5c (corresponding to the distant point short-side length) coincide or mostly coincide.

In other words, as illustrated in FIG. 14, since the distance from lens system 110 of 5a from 5c is greater than of 0a from 0c, the angle of view in the short-side direction of a portion in which an image passes from 5a to 5c is smaller than the angle of view in the short-side direction of a portion in which an image passes from 0a to 0c (optical axis 119). Therefore, magnification in the short-side direction increases, the number of imaging pixels that image an image included in a single angle of view increases, and the resolution in the short-side direction increases.

The above is one advantageous effect obtained by the present disclosure and cannot be obtained by Conventional Techniques 1 and 2 shown below.

With Conventional Techniques 1 and 2, as illustrated in FIG. 15, objects are disposed in a plane perpendicular to the optical axis, and the objects with the same height disposed at different distances from the lens system do not get the same height. To give a specific example, the lens system used in Conventional Technique 2 is a rotationally symmetric lens system. In this case, an angle of view in the short-side direction is the same in all long-side positions of 0 to 5 in FIG. 14, and the height of an imaged image becomes smaller from the optical axis in the long-side direction. In other words, as shown in convention technique in FIG. 15, a length from 5a to 5c is smaller than a length from 0a to 0c.

Note that in the rotationally symmetric lens system according to Conventional Technique 2 in FIG. 15, since the angle of view in a vertical direction from 1 to 5 is the same, a resolution in the vertical direction is also the same. Since magnification of the lens system of Conventional Technique 2 increases toward a periphery thereof, images are obtained with different warping states in the short-side direction in each long-side position.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The imaging device can be used for moving bodies that carry people such as vehicles, aircrafts, and seacrafts; moving bodies that do not carry people such as drones and transportation devices; moving bodies such as the distal end of a robot arm; etc.

The invention claimed is:

1. An imaging device, comprising:
an imaging element in which a plurality of imaging pixels are arranged in a matrix in a rectangular area; and
a lens system including a free-form lens for forming an image in the rectangular area of the imaging element, wherein
the free-form lens has a shape that is adjusted so that an optical axis height and a distant point height are equal, (i) the optical axis height being a length in a short-side direction of a first image of a first imaging object that is formed in the rectangular area and exists on an optical axis of the lens system, and (ii) the distant point height being a length in the short-side direction of a second image of a second imaging object that is formed in the rectangular area, exists in a position away from the optical axis in a long-side direction that intersects the optical axis and the first imaging object, and has a same height as the first imaging object in the short-side direction.

2. The imaging device according to claim 1, wherein the free-form lens has,
in the long-side direction of the rectangular area,
a resolution that changes along an optical axis long-side resolution curve in which the resolution increases from the optical axis toward a first end that is at least one end; and
the resolution that changes along a distant point long-side resolution curve in which the resolution increases from a position away from the optical axis in the short-side direction toward the first end,
in the short-side direction of the rectangular area,
the resolution that changes along an optical axis short-side resolution curve in which the resolution increases from the optical axis of the lens system toward a second end that is at least one end;
the resolution that changes along a distant point short-side resolution curve in which the resolution increases from the position away from the optical axis in the long-side direction toward the second end,
the shape of the free-form lens makes it possible to form the image in the rectangular area so that the distant point long-side resolution curve (i) follows a shape of the optical axis long-side resolution curve, and (ii) has the resolution that is higher than the resolution of the optical axis long-side resolution curve, and
the distant point short-side resolution curve (i) follows a shape of the optical axis short-side resolution curve, and (ii) has the resolution that is higher than the resolution of the optical axis short-side resolution curve.

3. The imaging device according to claim 1, wherein the shape of the free-form lens is adjusted so that an optical axis width and a distant point width are equal, (i) the optical axis width being a length in the long-side direction of the first image of the first imaging object that is formed in the rectangular area and exists on the optical axis, and (ii) the distant point width being a length in the long-side direction of the second image of the second imaging object that is formed in the rectangular area, exists in the position away from the optical axis in the long-side direction that intersects the optical axis and the first imaging object, and has a same width as the first imaging object in the long-side direction.

4. The imaging device according to claim 2, wherein
the resolution along the distant point long-side resolution curve increases from the optical axis long-side resolution curve, and
the resolution along the distant point short-side resolution curve increases from the optical axis short-side resolution curve.

5. The imaging device according to claim 1, wherein
a ratio of an angle of view in the long-side direction of the lens system to an angle of view in the short-side direction of the lens system is greater than or equal to a ratio of a length of the rectangular area of the imaging element in the long-side direction to a length of the rectangular area of the imaging element in the short-side direction.

6. The imaging device according to claim 1, wherein the shape of the free-form lens is adjusted so that an aspect ratio of the second image of the second imaging object formed in the rectangular area does not change even as the second image moves from one side of the rectangular area to another side in the long-side direction as a result of the second imaging object moving in the long side direction in a plane perpendicular to the optical axis.

\* \* \* \* \*